US008281651B2

(12) United States Patent
Tsukamoto

(10) Patent No.: US 8,281,651 B2
(45) Date of Patent: Oct. 9, 2012

(54) VEHICULAR ABNORMALITY DIAGNOSING APPARATUS

(75) Inventor: Keisuke Tsukamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 114 days.

(21) Appl. No.: 12/974,273

(22) Filed: Dec. 21, 2010

(65) Prior Publication Data

US 2011/0146394 A1    Jun. 23, 2011

(30) Foreign Application Priority Data

Dec. 21, 2009    (JP) .................................. 2009-289607

(51) Int. Cl.
*G01M 15/04*    (2006.01)
(52) U.S. Cl. ................. 73/114.31; 73/114.56; 73/114.77
(58) Field of Classification Search ............... 73/114.31, 73/114.56, 114.77; 123/572; 439/188, 194
See application file for complete search history.

(56) References Cited

U.S. PATENT DOCUMENTS

| 6,532,931 | B1 | 3/2003 | Saba et al. | |
| 6,698,410 | B2 * | 3/2004 | Saba et al. | 123/572 |
| 7,402,059 | B2 * | 7/2008 | Ciocci et al. | 439/191 |
| 2002/0016102 | A1 * | 2/2002 | Saba | 439/188 |
| 2002/0058436 | A1 * | 5/2002 | Saba | 439/191 |
| 2003/0178015 | A1 * | 9/2003 | Saba et al. | 123/572 |
| 2006/0216979 | A1 * | 9/2006 | Ciocci et al. | 439/194 |

FOREIGN PATENT DOCUMENTS

| JP | S58-038327 | A | 3/1983 |
| JP | S63-205535 | A | 8/1988 |
| JP | S64-027447 | U | 2/1989 |
| JP | H04-362233 | A | 12/1992 |
| JP | 2001-132427 | A | 5/2001 |
| JP | 2002042969 | A | 2/2002 |
| JP | 2007-113517 | A | 5/2007 |
| JP | 2009068452 | A | 4/2009 |

OTHER PUBLICATIONS

Japanese Office Action issued Jan. 4, 2012 from JP 2009-289607 with partial English translation.

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

A vehicular abnormality diagnosing apparatus that diagnoses an abnormality regarding a connection state of a pair of members that are mounted in a vehicle and connected together, includes a detecting portion that outputs, as an output signal, a first detection signal when the pair of members are in a normal connected state, and a second detection signal when the pair of members are in a state other than the normal connected state; a counting portion that counts at least one of the number of times that the output signal changes from the first detection signal to the second detection signal and the number of times that the output signal changes from the second detection signal to the first detection signal, as an output signal fluctuation count; and a determining portion that determines that there is an abnormality in the connection state when an abnormality determining condition including a condition that the output signal fluctuation count during a predetermined period be equal to or greater than a predetermined count is satisfied.

20 Claims, 5 Drawing Sheets

VEHICULAR ABNORMALITY DIAGNOSING APPARATUS

CROSS-REFERENCE TO RELATED APPLICATION

This application claims priority of Japanese Patent Application No. 2009-289607 filed on Dec. 21, 2009, which is incorporated herein by reference in its entirety including the specification, drawings and abstract.

BACKGROUND OF THE INVENTION

1. Field of the Invention

The invention relates to a vehicular abnormality diagnosing apparatus that diagnoses an abnormality regarding the connection state of a pair of members that are mounted in a vehicle and connected together.

2. Description of the Related Art

Japanese Patent Application Publication No. 2009-068452 (JP-A-2009-068452), for example, describes a dry sump type internal combustion engine in which an oil tank is provided separate from an internal combustion engine. In this dry sump type internal combustion engine, an oil tank and an oil pan (i.e., a dry sump) provided below the internal combustion engine main body are connected by an oil conduit. Oil in the oil pan is drawn up by a pump and stored in the oil tank via the oil conduit. Then the oil stored in this oil tank is drawn up by a pump and supplied to portions of the internal combustion engine that need lubricating.

Also, in the internal combustion engine described in JP-A-2009-068452, the oil tank is connected to a crank chamber by a blowby gas discharge conduit. Blowby gas that has leaked into the crank chamber is introduced into the oil tank via this blowby gas discharge conduit. Then the blowby gas in the oil tank is introduced into an intake passage via a blowby gas introduction conduit that connects the oil tank with the intake passage.

The blowby gas introduction conduit normally connects the oil tank with the intake passage via a ventilation case formed inside a cylinder head cover. Also, flanges are formed on both ends of the blowby gas intake conduit. The flange on one end is fixed to the ventilation case, and the flange on the other end is fixed to the oil tank, such that the blowby gas introduction conduit is fixed to the ventilation case and the oil tank.

Here, it may accidentally happen that the operation of connecting the flange of the blowby introduction conduit to the ventilation case or the oil tank has not been performed, or even though that connecting operation has been performed, vibration generated in the vehicle as it runs may cause the connection to come loose. In these cases, blowby gas may end up leaking outside from the blowby gas introduction conduit.

Therefore, it is desirable to reliably determine whether the blowby gas introduction conduit and the ventilation case or the like are in a normal connected state.

SUMMARY OF INVENTION

The invention provides a vehicular abnormality diagnosing apparatus capable of reliably diagnosing an abnormality in the connection state of a pair of members that are connected together, while inhibiting a misdiagnosis from being made due to some random cause, even if that connection state fluctuates between a normal connected state and a state other than the normal connected state.

A first aspect of the invention relates to a vehicular abnormality diagnosing apparatus that diagnoses an abnormality regarding a connection state of a pair of members that are mounted in a vehicle and connected together, that includes a detecting portion that outputs a first detection signal when the pair of members are in a normal connected state, and outputs a second detection signal when the pair of members are in a state other than the normal connected state, as an output signal; a counting portion that counts at least one of the number of times that the output signal changes from the first detection signal to the second detection signal and the number of times that the output signal changes from the second detection signal to the first detection signal, as an output signal fluctuation count; and a determining portion that determines that there is an abnormality in the connection state of the pair of members when an abnormality determining condition is satisfied, wherein the abnormality determining condition includes a condition that the output signal fluctuation count during a predetermined period be equal to or greater than a predetermined count.

In this first aspect, the number of times that the output signal of the detecting portion changes between the first detection signal indicating that the pair of members are in a normal connected state and the second detection signal indicating that the pair of members are in a connected state other than the normal connected state is counted. If the detection signal fluctuation count during a predetermined period is equal to or greater than a predetermined count, it is determined that the connection state of the pair of members is abnormal. Therefore, it is possible to inhibit a misdiagnosis that the connection state of the pair of members is abnormal from being made due to some random cause such as the reliability of the connection state signal temporarily decreasing as a result of noise superimposed on the output signal of the detecting portion. As a result, a highly reliable abnormality diagnosis is able to be made. Incidentally, the output signal fluctuation count may be the number of times that the output signal of the detecting portion changes from the first detection signal to the second detection signal, or the number of times that the output signal of the detecting portion changes from the second detection signal to the first detection signal, or the sum of those numbers.

A second aspect of the invention relates to a vehicular abnormality diagnosing apparatus that diagnoses an abnormality regarding a connection state of a pair of members that are mounted in a vehicle and connected together, that includes a detecting portion that outputs a first detection signal when the pair of members are in a normal connected state, and outputs a second detection signal when the pair of members are in a state other than the normal connected state, as an output signal; an integrating portion that integrates the time during which the second detection signal is output, as the output signal fluctuation time, when the output signal fluctuates between the first detection signal and the second detection signal; and a determining portion that determines that there is an abnormality in the connection state of the pair of members when the abnormality determining condition is satisfied, wherein the abnormality determining condition includes a condition that the output signal fluctuation time during a predetermined period be equal to or longer than a predetermined time.

In this second aspect, when the output signal of the detecting portion fluctuates between the first detection signal indicating that the pair of members are in a normal connected state and the second detection signal indicating that the pair of members are in a connected state other than the normal connected state, the time during which the second detection signal is output is integrated as the output signal fluctuation time. If the output signal fluctuation time during a predetermined period is equal to or longer than a predetermined time, then it is determined that the connection state of the pair of members is abnormal. Therefore, it is possible to inhibit a misdiagnosis that the connection state of the pair of members is abnormal from being made due to some random cause such as the reliability of the connection state signal temporarily decreasing as a result of noise superimposed on the output signal of the detecting portion. As a result, a highly reliable abnormality diagnosis is able to be made.

A third aspect of the invention relates to a vehicular abnormality diagnosing apparatus that diagnoses an abnormality regarding a connection state of a pair of members that are mounted in a vehicle and connected together, that includes a detecting portion that outputs a first detection signal when the pair of members are in a normal connected state, and outputs a second detection signal when the pair of members are in a state other than the normal connected state, as an output signal; an integrating portion that integrates the time during which the first detection signal is output, as the output signal fluctuation time, when the output signal fluctuates between the first detection signal and the second detection signal; and a determining portion that determines that there is an abnormality in the connection state of the pair of members when the abnormality determining condition is satisfied, wherein the abnormality determining condition includes a condition that the output signal fluctuation time during a predetermined period be shorter than a predetermined time.

In this third aspect, when the output signal of the detecting portion fluctuates between the first detection signal indicating that the pair of members are in a normal connected state and the second detection signal indicating that the pair of members are in a connected state other than the normal connected state, the time during which the first detection signal is output is integrated as the output signal fluctuation time. If the output signal fluctuation time during a predetermined period is shorter than a predetermined time, it is determined that the connection state of the pair of members is abnormal. Therefore, it is possible to inhibit a misdiagnosis that the connection state of the pair of members is abnormal from being made due to some random cause such as the reliability of the connection state signal temporarily decreasing as a result of noise superimposed on the output signal of the detecting portion. As a result, a highly reliable abnormality diagnosis is able to be made.

In the first, second, and third aspects described above, the determining portion may set, as the predetermined period, an operating period from when the vehicle starts to be operated until the vehicle stops being operated, and may include a storing portion that stores, as possible abnormality information even after the operating period ends, an indication that it has been determined that there is an abnormality in the connection state of the pair of members during the operating period, when it has been determined that there is an abnormality in the connection state of the pair of members during the operating period, and an abnormality confirming portion that executes an abnormality confirmation process of confirming a diagnosis that the connection state of the pair of members is abnormal and storing the diagnosis, when the possible abnormality information corresponding to a plurality of consecutive operating periods is all stored in the storing portion.

In the structure described above, the determining portion may also include an initializing portion that initializes the possible abnormality information stored in the storing portion, when the operating period has ended without the indication that it has been determined that there is the abnormality in the connection state of the pair of members.

Also, in the structure described above, the abnormality confirming portion may execute the abnormality confirming process when the possible abnormality information corresponding to two consecutive operating periods is all stored in the storing portion.

According to these structures, a diagnosis that there is an abnormality is first confirmed when a determination that the connection state of the pair of members is abnormal continues to be made for a plurality of consecutive operating periods, so the reliability of that diagnosis can be further increased.

In the first, second, and third aspects described above, the pair of members may be formed of conductive members and be electrically conducted when in the normal connected state, and the detecting portion may be a portion that outputs the first detection signal when the pair of members are in a conducted state, and outputs the second detection signal when the pair of members are in a non-conducted state.

According to this structure, there is a correlation between the connection state of the pair of members and the electrical conduction state of those members, so it is possible to easily detect whether the pair of members are in a normal connected state based on that conduction state.

In the first, second, and third aspects described above, a fluid passage that enables fluid to flow may be formed inside the pair of members.

In the first, second, and third aspects described above, the pair of members may form a blowby gas introduction conduit that introduces blowby gas from an oil tank to an intake passage.

According to these structures, it is possible to reliably diagnose an abnormality related to the connection state of the pair of members, such as fluid such as blowby gas leaking outside from a fluid passage in the members.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
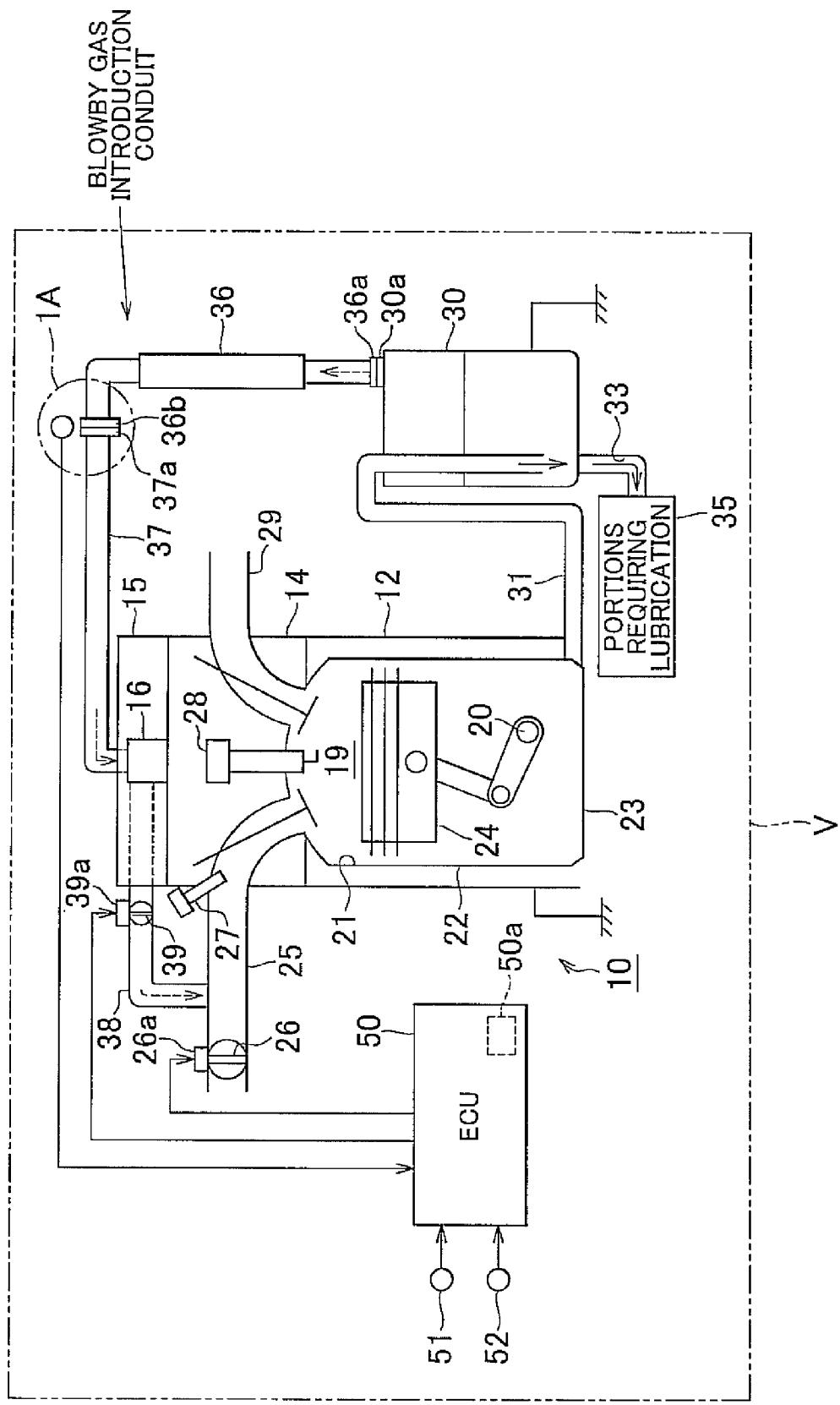
FIG. 1 is a view showing frame format of an abnormality diagnosing apparatus according to an example embodiment of the invention, a vehicle to which this abnormality diagnosing apparatus may be applied, and the structure of an internal combustion engine mounted in that vehicle.

Hereinafter, an example embodiment of the vehicular abnormality diagnosing apparatus of the invention will be described with reference to FIGS. 1 to 5G. FIG. 1 is a view schematically showing the structure of and around an internal combustion engine mounted in a vehicle. As shown in FIG. 1, a cylinder 21 that forms a combustion chamber 19 is formed in a cylinder block 12 of an internal combustion engine 10 mounted in a vehicle V. A piston 24 that moves in a reciprocating manner is housed in the cylinder 21. As this piston 24 moves in a reciprocating manner, a crankshaft 20 rotates.

Also, a crank chamber 22 is formed in a lower portion of the cylinder block 12, and an oil pan 23 is mounted to the lower portion of this crank chamber 22. Oil used for lubricating the internal combustion engine 10 is stored in this oil pan 23. A cylinder head 14 in which a valve system is arranged is mounted to the upper portion of the cylinder block 12. Moreover, a cylinder head cover 15 that inhibits oil from spattering out as the valve system is driven is mounted to the upper portion of this cylinder head 14. A ventilation case 16 is formed inside this cylinder head cover 15.

Furthermore, in the internal combustion engine 10, an intake passage 25 that feeds intake air to the combustion chamber 19 and an exhaust passage 29 through which exhaust gas produced by the combustion in the combustion chamber 19 is discharged are connected to the combustion chamber 19. The passage area of this intake passage 25 is adjusted according to the opening amount of an intake throttle valve 26 provided in the intake passage 25. The opening amount of this intake throttle valve 26 is controlled by driving the intake throttle valve 26 with an actuator 26a. Also, a fuel injection valve 27 that injects (i.e., supplies) fuel into the intake passage 25 is provided in the intake passage 25. The fuel injected from the fuel injection valve 27 mixes with the air that flows into the intake passage 25 to form an air-fuel mixture. Then this air-fuel mixture is ignited by a spark plug 28 in the combustion chamber 19 and combusted. This combustion causes the piston 24 to move in a reciprocating manner, which in turn causes the crankshaft 20 to rotate. The combusted air-fuel mixture is then discharged as exhaust gas from the combustion chamber 19 into an exhaust passage 29.

Also, the internal combustion engine 10 is a dry sump type internal combustion engine in which an oil tank 30 is provided separate from the oil pan 23. As shown in FIG. 1, the oil tank 30 and the oil pan 23 of the internal combustion engine 10 are connected by an oil conduit 31. Oil inside the oil pan 23 is drawn up by a pump, not shown, and stored in the oil tank 30 via the oil conduit 31, as shown by the solid arrow in FIG. 1. Then, the oil thus stored in this oil tank 30 is drawn up by a pump, not shown, and supplied to portions 35 requiring lubrication in the internal combustion engine 10 via a supply passage 33.

Furthermore, in the internal combustion engine 10 of this example embodiment, blowby gas that has leaked into the crank chamber 22 is introduced together with the oil in the oil conduit 31 into the oil tank 30 via the oil conduit 31. Then the blowby gas in the oil tank 30 is introduced into the intake passage 25 via a blowby gas introduction conduit that connects the oil tank 30 to the intake passage 25.

Here, the blowby gas introduction conduit in this example embodiment is formed by a first conduit 36, a second conduit 37, and a third conduit 38 that is communicated with the second conduit 37 via the ventilation case 16. This first conduit 36 has flanges 36a and 36b on both ends. The first conduit 36 is connected to the oil tank 30 by the flange 36a on one end of the first conduit 36 being fixed to a flange 30a formed on the oil tank 30. Also, the first conduit 36 is connected to the second conduit 37 by the flange 36b on the other end of the first conduit 36 being fixed to a flange 37a formed on one end of the second conduit 37. The other end of the second conduit 37 and the one end of the third conduit 38 are both communicated via the ventilation case 16 provided inside the cylinder head cover 15. Also, the other end of the third conduit 38 is connected to the intake passage 25 downstream of the intake throttle valve 26. A metering valve 39 that meters the blowby gas introduced into the intake passage 25 by changing the passage area of the third conduit 38 is provided in the third conduit 38. The opening amount of this metering valve 39 is controlled by driving the metering valve 39 with an actuator 39a. Incidentally, the second conduit 37, the ventilation case 16, and the oil tank 30 are all made of conductive metal material, while a portion of the first conduit 36 is made of non-conductive material such as rubber. When the first conduit 36, the second conduit 37, the ventilation case 16, and the oil tank 30 are connected together, they are in an electrically conducted state. Also, the ventilation case 16 and the oil tank 30 are electrically grounded to the body or the like of the vehicle V.

Blowby gas that contains unburned fuel that has leaked into the crank chamber 22 from the combustion chamber 19 as the internal combustion engine 10 is driven can be combusted again by introducing the blowby gas into the intake passage 25, as shown by the broken arrow in FIG. 1, through the blowby gas introduction conduit having this kind of structure.

Also, the internal combustion engine 10 includes an electronic control unit (ECU) 50 that comprehensively controls the internal combustion engine 10. This ECU 50 includes a central processing unit (CPU) that executes various calculations related to various controls, nonvolatile memory (ROM) in which programs and data necessary for those calculations are stored, volatile memory (RAM) in which the calculation results of the CPU are temporarily stored, and input/output ports for inputting and outputting signals from and to external devices, and the like. The ECU 50 also includes backup RAM that is able to store various calculation results by being supplied with power from a battery, not shown, even if the internal combustion engine 10 is stopped, memory 50a formed of nonvolatile rewriteable memory (such as EEPROM) that is able to store various calculation results even if the power stops being supplied from the battery, and a drive circuit for driving various devices of the internal combustion engine 10, and an A/D conversion circuit, not shown.

Output signals from various sensors, such as an outside air temperature sensor 51 that detects the outside air temperature and a main switch 52 that is operated by a driver to turn the internal combustion engine 10 on and off, are input to the input port of the ECU 50.

Incidentally, if, for example, the flange 36b of the first conduit 36 and the flange 37a of the second conduit 37 of the blowby gas introduction conduit have not been connected with a bolt, or if this bolt loosens and comes unfastened as the vehicle is driven, i.e., if the first conduit 36 and the second conduit 37 are not in the normal connected state, blowby gas that flows through the conduits 36 and 37 may leak out.

Therefore, in this example embodiment, a structure is provided that electrically detects whether the first conduit 36 and the second conduit 37 are in the normal connected state. Hereinafter, the structure of this detecting portion will be described with reference to FIGS. 2 and 3. Incidentally, FIGS. 2 and 3 are enlarged views of portion 1A in FIG. 1, with the left-right direction reversed.

Figure 2:
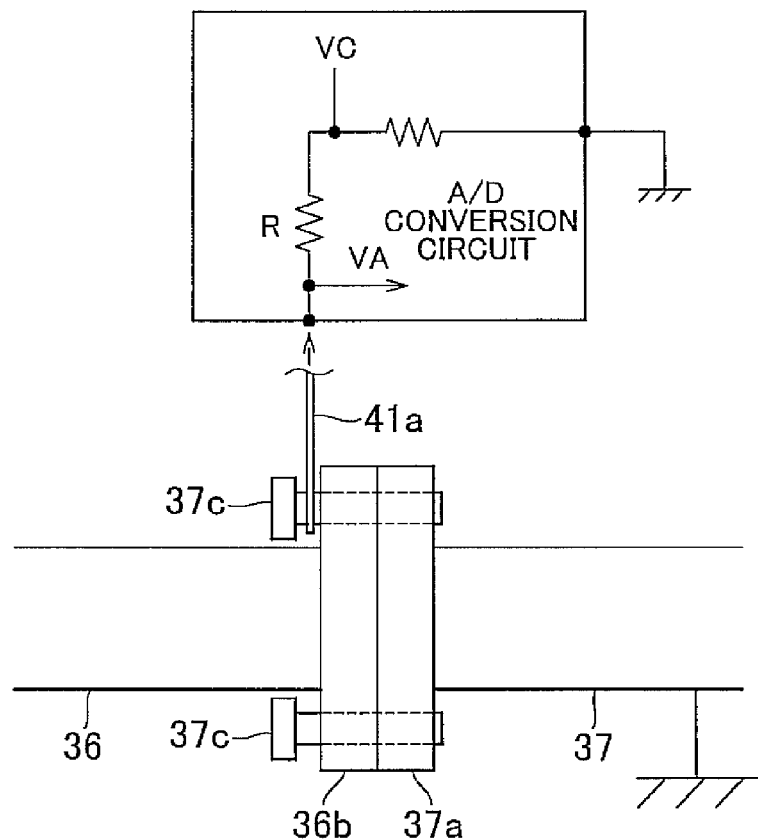
FIG. 2 is an enlarged view of portion 1A in FIG. 1, that shows a first conduit and a second conduit in a normal connected state.

As shown in FIG. 2, a signal wire 41a for detecting the connection state of the first conduit 36 and the second conduit 37 is fastened together with the flanges 36b and 37a by bolts 37c that connect the flange 36b of the first conduit 36 and the flange 37a of the second conduit 37 together. Accordingly, the signal wire 41a, the first conduit 36, and the second conduit 37 are all in an electrically conducted state. Also, while this one end of the signal wire 41a is fastened together with the flanges 36b and 37a in this way, the other end of the signal wire 41a is connected to the input port of the ECU 50. As shown in FIG. 2, a predetermined voltage VC is applied to this signal wire 41a via a resistor R. In the ECU 50, branch voltage VA between the resistor R and the signal wire 41a is input to the A/D conversion circuit. Incidentally, this branch voltage VA becomes 0V when the flange 36b of the first conduit 36 and the flange 37a of the second conduit 37 are connected by the bolts 37c.

Figure 3:
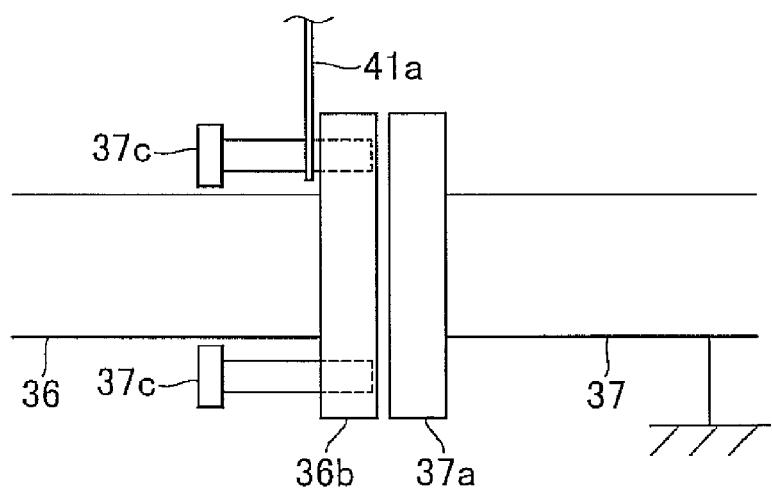
FIG. 3 is an enlarged view of portion 1A in FIG. 1, that shows a first conduit and a second conduit in a disconnected state.

On the other hand, when the first conduit 36 and the second conduit 37 are not in the normal connected state, as shown in FIG. 3, the branch voltage VA becomes a predetermined voltage that is determined by the resistance of the resistor R and the voltage VC because the flange 36b is in an electrically non-conducted state with respect to the flange 37a. The A/D conversion circuit that receives this branch voltage VA converts it into a secondary signal (i.e., a connection state signal) which it then outputs. That is, when the first conduit 36 and the second conduit 37 are in the normal connected state, as shown in FIG. 2, the branch voltage VA is 0V. In this case, the connection state signal output from the A/D conversion circuit is "Low". On the other hand, when the bolts 37c have come loose or the like and the first conduit 36 and the second conduit 37 are not in the normal connected state, as shown in FIG. 3, the branch voltage VA is a higher value than 0V. In this case, the connection state signal output from the A/D conversion circuit is "Hi".

Accordingly, the ECU 50 is able to determine that the first conduit 36 and the second conduit 37 are in the normal connected state when the connection state signal is "Low", and determine that the first conduit 36 and the second conduit 37 are in a state other than the normal connected state when the connection state signal is "Hi". That is, the ECU 50 monitors the connection state of the first conduit 36 and the second conduit 37 based on this connection state signal. Incidentally, in this example embodiment, the "Low" connection state signal functions as the first detection signal, and the "Hi" connection state signal functions as the second detection signal.

Incidentally, as shown in FIG. 3, when bolt 37c comes loose, the flange 36b of the first conduit 36 and the flange 37a of the second conduit 37 may repeatedly come in and out of contact with each other from vibration as the vehicle runs. In this case, even though the first conduit 36 and the second conduit 37 are not connected normally, the connection state signal will temporarily become "Low", i.e., a value indicating that the first conduit 36 and the second conduit 37 are in the normal connected state, the instant that the flanges 36b and 37a come into contact with each another. On the other hand, the connection state signal will temporarily become "Hi", i.e., a value indicating that the first conduit 36 and the second conduit 37 are not in the normal connected state, the instant that the flanges 36b and 36a come out of contact with each another. Also, the same phenomenon also occurs when the bolt 37c and the flange 37a of the second conduit 37 repeatedly come in and out of contact with each other and the end portion of the signal wire 41a slips off of the bolt 37c and contacts another grounded member. Therefore, when diagnosing an abnormality in the connection state of the first conduit 36 and the second conduit 37 based on a "Hi" connection state signal being detected for a predetermined duration, for example, then even if a "Hi" connection state signal is detected, a determination that there is an abnormality might not be made because that duration is short.

In case when the value of the connection state signal fluctuates in this way, one conceivable way is to diagnose that the connection state of the conduits 36 and 37 is abnormal promptly when the value of the connection state signal becomes "Hi", even if only for an extremely short period of time. The problem with this approach, however, is that in a vehicle having a large number of various devices that cause noise, such as spark plugs and the like, the output value of the connection state signal may change irrespective of the connection state of the conduits 36 and 37 due to noise being superimposed on the signal of the detecting portion such as the signal wire 41a or the A/D conversion circuit. Therefore, if a diagnosis of an abnormality in the connection state of the conduits 36 and 37 is made promptly based on the value of the connection state signal temporarily becoming "Hi" as described above, it is highly likely that a misdiagnosis of an abnormality in the connection state of the conduits 36 and 37 will be made when a "Hi" connection state signal happens to be temporarily output as a result of noise or the like even though the conduits 36 and 37 are in the normal connected state.

Incidentally, this type of problem is not limited to a blowby gas introduction conduit provided in a dry sump type internal combustion engine, but generally also occurs with other members that are mounted in a vehicle and connected together, and in which there is a need to diagnose an abnormality in that connection state.

Figure 4A:
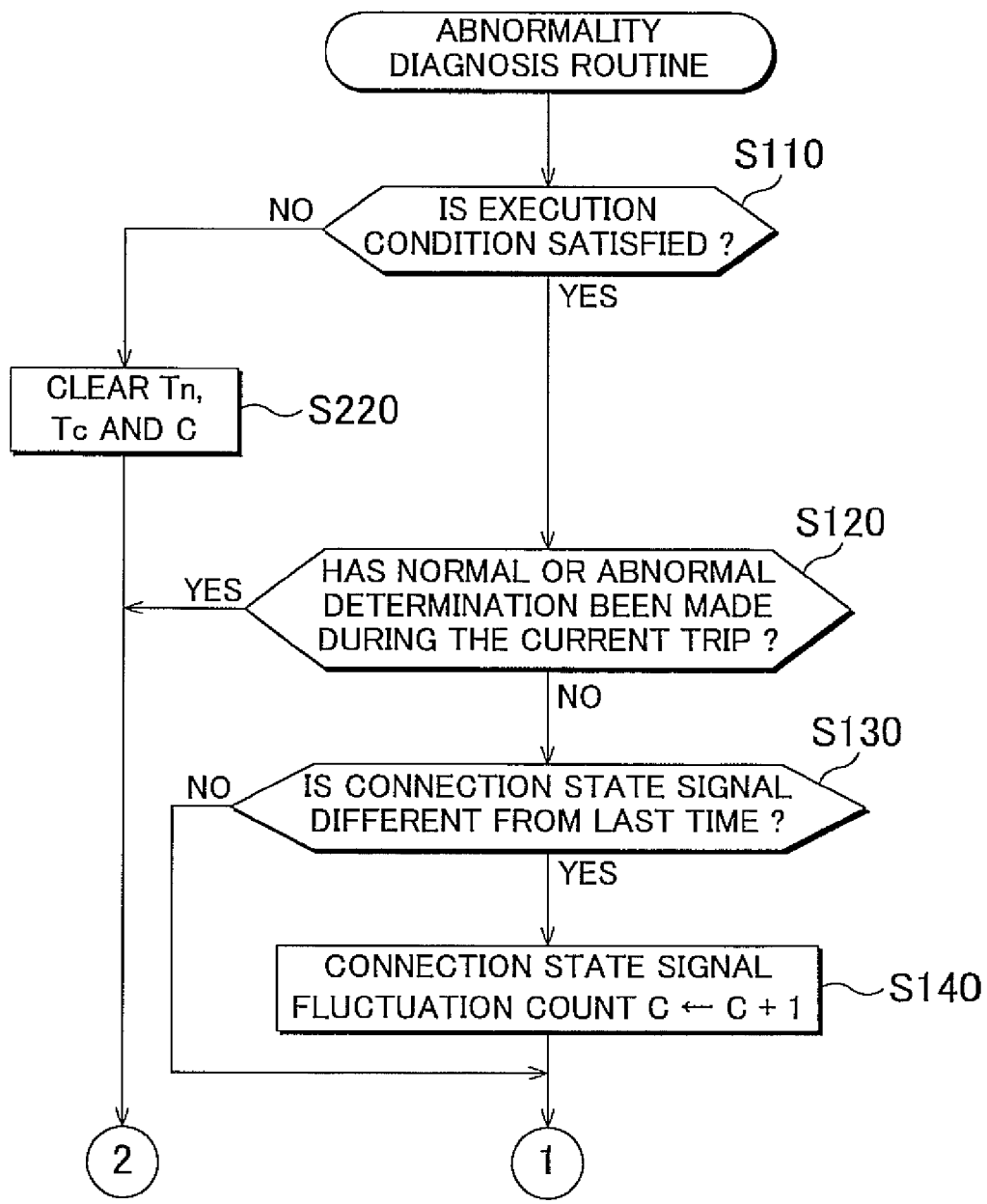
FIGS. 4A and 4B are flowcharts illustrating the steps in an abnormality diagnosis routine according to the example embodiment of the invention.
Figure 4B:
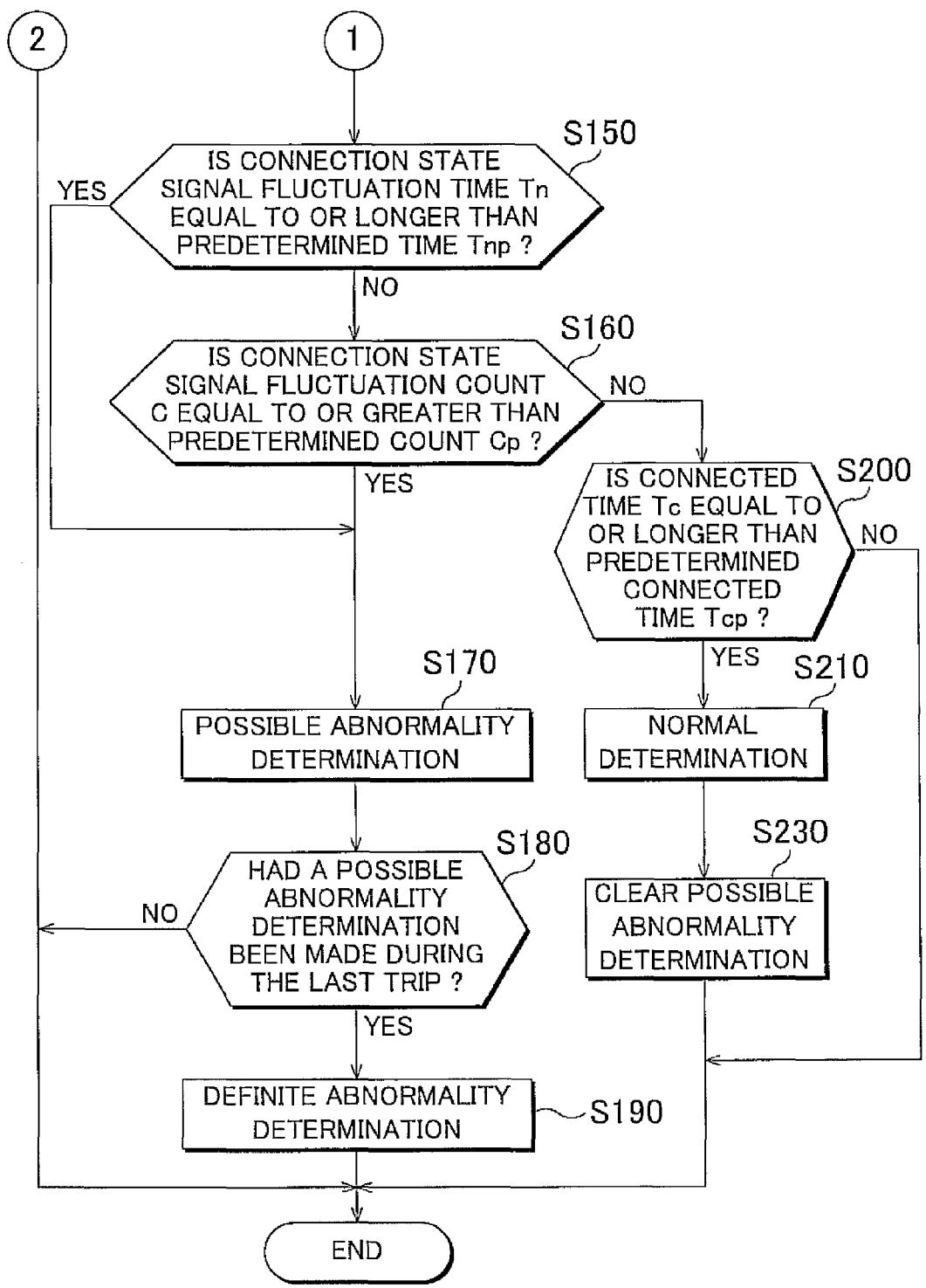

Therefore, in this example embodiment, even if the connection state signal fluctuates between "Low" and "Hi", an abnormality diagnosis routine is executed to reliably perform an abnormality diagnosis on the connection state, while inhibiting a misdiagnosis due to some random cause such as noise. Hereinafter, the steps of this abnormality diagnosis routine will be described with reference to FIGS. 4A and 4B. Incidentally, the routine shown in FIGS. 4A and 4B is repeatedly executed at predetermined time cycles by the ECU 50.

When the routine starts, it is first determined whether an execution condition is satisfied (step S110). This execution condition is a condition such that (1) the voltage of the battery be equal to or greater than a predetermined voltage, (2) there be no abnormality in the ECU 50, including the A/D conversion circuit and the like, and (3) the running environment of the vehicle is not an extremely low temperature (i.e., that the outside air temperature be equal to or higher than a predetermined temperature). The execution condition is determined to be satisfied when all of these conditions (1) to (3) are satisfied.

When it is determined that the execution condition is satisfied (i.e., YES in step S110), it is next determined whether a determination of normal or abnormal (also simply referred to as a "normal or abnormal determination" in this specification) for the connection state of the first conduit 36 and the second conduit 37 has been made even once during the current trip, i.e., during the period from after the driver turns the main switch 52 on and starts the vehicle V until the driver turns the main switch 52 off and stops the vehicle V (step S120). If during the current trip a possible abnormality determination (i.e., a determination that there may be an abnormality) has already been made in step S170, which will be described later, or if a normal determination has been made in step S210, then it is determined in this step S120 that a normal or abnormal determination has been made. If it is determined that the connection state of the first conduit 36 and the second conduit 37 has not yet been determined during the current trip (i.e., NO in step S120), the process proceeds on to the next step.

Continuing on, it is determined whether the value of the connection state signal described above is different from the last time (step S130). If it is determined that the value of the connection state signal is different from the last time (i.e., YES in step S130), a connection state signal fluctuation count C is increased incrementally by 1 (step S140), and the process proceeds on to the next step. If, on the other hand, it is determined that the connection state signal is the same as the last time (i.e., NO in step S130), the process proceeds on to the next step without increasing the connection state signal fluctuation count C. That is, the sum of the number of times that the connection state signal has changed from "Low" to "Hi" and the number of times that the connection state signal has changed from "Hi" to "Low" through steps S130 and S140 is calculated as the connection state signal fluctuation count C.

Next, it is determined whether the connection state signal fluctuation time Tn is equal to or longer than a predetermined time Tnp (step S150). This connection state signal fluctuation time Tn is calculated by integrating the time during which the connection state signal is "Hi", i.e., the time during which it is determined that the first conduit 36 and the second conduit 37 are not in the normal connected state. Here, if it is determined that this connection state signal fluctuation time Tn is shorter than the predetermined time Tnp (i.e., NO in step S150), then it is next determined whether the connection state signal fluctuation count C is equal to or greater than a predetermined count Cp (step S160). If it is determined that the connection state signal fluctuation count C is equal to or greater than the predetermined count Cp (i.e., YES in step S160) and it is determined that the connection state signal fluctuation time Tn is equal to or longer than the predetermined time Tnp (i.e., YES in step S150), then it is determined that it is extremely likely that there is an abnormality in the connection state of the first conduit 36 and the second conduit 37, so a possible abnormality determination is made (step S170). The diagnosis that this possible abnormality determination has been made is stored as possible abnormality information in the backup RAM of the ECU 50.

Next, it is determined whether a possible abnormality determination had been made during the last trip based on the information stored in the backup RAM (step S180). In step S180, it is determined whether a possible abnormality determination has been made in step S170 for two consecutive trips, i.e., the last trip and the current trip. If it is determined that a possible abnormality determination had been made in the last trip as well (i.e., YES in step S180), then a diagnosis that the connection state of the first conduit 36 and the second conduit 37 is abnormal is confirmed, so a definite abnormality determination (i.e., a determination that there is definitely an abnormality) is made (step S190). Then the diagnosis that this definite abnormality determination has been made is stored in EEPROM, and this cycle of the routine ends. Because the diagnosis is stored in EEPROM, i.e., non volatile rewritable memory, in this way, the diagnosis is able to be retained even if the supply of power from the battery to the memory 50a is cut off. Then an operation to check the connection state of the conduits 36 and 37 is performed, and that information is cleared from the EEPROM after the necessary steps, such as redoing the connection, have been performed. If, on the other hand, a possible abnormality determination had not been made during the last trip (i.e., NO in step S180), then this cycle of the process ends. Incidentally, steps S180 and S190 function as the abnormality confirmation process.

On the other hand, if it is determined that the connection state signal fluctuation time Tn is shorter than the predetermined time Tnp (i.e., NO in step S150) and the connection state signal fluctuation count C is less than the predetermined count Cp (i.e., NO in step S160), then it is determined whether the time (i.e., the connected time) Tc during which the connection state signal continues to be "Low" is equal to or longer than a predetermined connected time Tcp (step S200). Here, this connected time Tc is the time during which it is determined that the first conduit 36 and the second conduit 37 are in the normal connected state, based on the connection state signal. This connected time Tc is measured continuously right up until step S200. More specifically, if the value of the connection state signal is currently "Low", then the time since the connection state signal had changed from "Hi" to "Low" up until the present is used as the connected time Tc. Also, if the value of the connection state signal is currently "Hi", then the time during which the value of the connection state signal had been "Low" last time is used as the connected time Tc.

Then, if it is determined that the connected time Tc is equal to or longer than the predetermined connected time Tcp (i.e., YES in step S200), it is determined that the connection state of the first conduit 36 and the second conduit 37 is normal (step S210). If possible abnormality information of the last trip is stored in the backup RAM, then it is erased to initialize (step S230), after which this cycle of the routine ends. Also, if it is determined that the connected time Tc is shorter than the predetermined connected time Tcp (i.e., NO in step S200), then this cycle of the process immediately ends.

Incidentally, the predetermined Tnp is set to a value at which it can be determined that there may be an abnormality in the connection state of the first conduit 36 and the second conduit 37 when the connection state signal fluctuation time Tn is equal to or longer than the predetermined time Tnp. Also, the predetermined count Cp is set to a value at which it can be determined that there may be an abnormality in the connection state of the first conduit 36 and the second conduit 37 when the connection state signal fluctuation count C is equal to or greater than the predetermined count Cp. Also, the predetermined connected time Tcp is set to a value at which it can be determined that the first conduit 36 and the second conduit 37 are in the normal connected state when the connected time Tc is equal to or longer than the predetermined connected time Tcp. The predetermined time Tnp, the predetermined count C, and the predetermined connected time Tcp are each set in advance through testing or the like.

Also, if the execution condition is not satisfied, i.e., if even one of the conditions (1) to (3) described above is not satisfied (i.e., NO in step S110), the values of the connection state signal fluctuation time Tn integrated thus far, the connected time Tc until immediately before, and the disconnected signal fluctuation count C are all cleared (step S220), and this cycle of the routine ends. Also, this cycle of the routine also ends if it is determined that a determination related to the connection state has already been made during the current trip (i.e., YES in step S120), even if the execution condition is satisfied.

Incidentally, in this example embodiment, the connection state signal fluctuation count C and the connection state signal fluctuation time Tn continue to be integrated during one trip, as long as they are not cleared in step S220. When power stops being supplied to the memory 50a of the ECU 50 when the trip ends, the values of the connection state signal fluctuation count C and the connection state signal fluctuation time Tn are cleared. That is, the values of the connection state signal fluctuation count C and the connection state signal fluctuation time Tn are always at 0 at the start of a trip.

Figure 5A:
FIGS. 5A to 5G are a timing charts showing the shifts in the engine operating state, the state of a connection state signal, the connection state signal fluctuation count, the connection state signal fluctuation time, the connected time, the existence or absence of a possible abnormality determination, and the existence or absence of a definite abnormality determination.
Figure 5B:
Figure 5C:
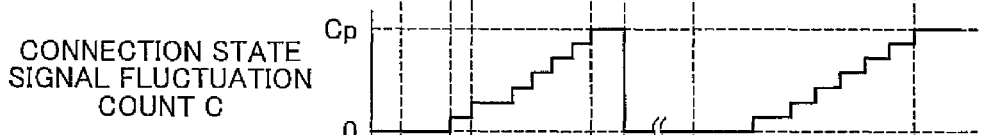
Figure 5D:
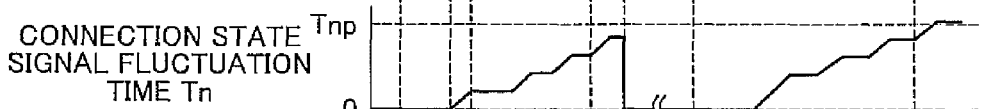
Figure 5E:
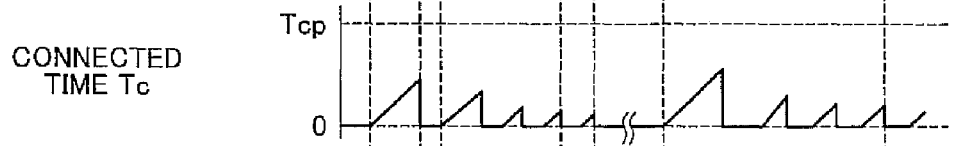
Figure 5F:
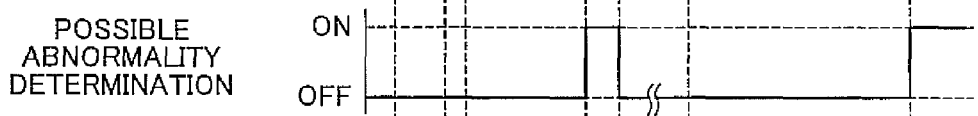
Figure 5G:

Hereinafter, the shifts in various parameters when this abnormality diagnosis routine is executed will be described with reference to FIGS. 5A to 5G. Incidentally, FIG. 5A is a timing chart showing the shift in the engine operating state, FIG. 5B is a timing chart showing the shift in the state of a connection state signal, FIG. 5C is a timing chart showing the shift in the connection state signal count C, FIG. 5D is a timing chart showing the shift in the connection state signal fluctuation time Tn, FIG. 5E is a timing chart showing the shift in the connected time Tc, FIG. 5F is a timing chart showing the shift in the existence or absence of a possible abnormality determination, and FIG. 5G is a timing chart showing the shift in the existence or absence of a definite abnormality determination.

If there is an abnormality in the connection state of the conduits 36 and 37, the conduits 36 and 37 will come in and out of contact repeatedly after the internal combustion engine is started (timing t1), for example. That is, the connection state signal will fluctuate between "Low" and "Hi". When the connection state signal is "Low", the connected time Tc is measured. Then when the connection state signal changes from "Low" to "Hi" (timing t2), the connected time Tc stops being measured and that value is cleared. Moreover, the connection state signal fluctuation count C is increased and the connection state signal fluctuation time Tn starts to be integrated. When the connection state signal changes again from "Hi" to "Low", the connection state signal fluctuation count C is again increased, and the connection state signal fluctuation time Tn stops being integrated and the connected time Tc starts being measured (timing t3). In this way, if the value of the connection state signal fluctuates between "Low" and "Hi" and the connection state signal fluctuation count C becomes equal to or greater than a predetermined count Cp (timing t4), for example, a possible abnormality determination of the connection state of the conduits 36 and 37 is made. Then when the trip ends, the values of the connection state signal fluctuation count C and the connection state signal fluctuation time Tn are cleared (timing t5). Also, if the internal combustion engine is then started again (timing t6) and the value of the connection state signal again fluctuates between "Low" and "Hi" and the connection state signal fluctuation count C again becomes equal to or greater than the predetermined count Cp (timing t7), for example, a possible abnormality determination of the connection state signal of the conduits 36 and 37 is made again. Because a possible abnormality determination had been made for the last trip as well, a definite abnormality determination is now made. Incidentally, a case has been described in which a possible abnormality determination of the connection state of the conduits 36 and 37 is made when the connection state signal fluctuation count C becomes equal to or greater than the predetermined count Cp. However, a possible abnormality determination may also be made in the same way when the connection state signal fluctuation time Tn becomes equal to or longer than the predetermined time Tnp.

The advantageous effects described below are obtained through the operations of the example embodiment described above.

(1) The number of times that the connection state signal fluctuates between "Low" and "Hi" is counted as the connection state signal fluctuation count C, and it is determined that the connection state of the conduits 36 and 37 is abnormal when the connection state signal fluctuation count C during one trip is equal to or greater than the predetermined count Cp, i.e., when the connection state signal fluctuates frequently between "Low" and "Hi". As a result, it is possible to inhibit a misdiagnosis that the connection state of the conduits 36 and 37 is abnormal from being made due to some random cause such as the reliability of the connection state signal temporarily decreasing as a result of noise. Therefore, a highly reliable abnormality diagnosis can be made.

(2) When the connection state signal fluctuates between "Low" and "Hi", the time during which that connection state signal is "Hi" is integrated as the connection state signal fluctuation time Tn. If this connection state signal fluctuation time Tn during one trip becomes equal to or longer than the predetermined time Tnp, then it is determined that the connection state of the conduits 36 and 37 is abnormal. As a result, it is possible to inhibit a misdiagnosis that the connection state of the conduits 36 and 37 is abnormal from being made due to some random cause such as the reliability of the connection state signal temporarily decreasing as a result of noise. Therefore, a highly reliable abnormality diagnosis is able to be made.

(3) An abnormal diagnosis is first confirmed when a determination that the connection state of the conduits 36 and 37 is abnormal continues to be made for two consecutive trips, so the reliability of that diagnosis is able to be further increased.

(4) There is a correlation between the connection state of the pair of conduits 36 and 37 and the electrical conduction state of those conduits 36 and 37, so it is possible to easily detect whether the conduits 36 and 37 are in the normal connected state based on that conduction state.

(5) An abnormality related to the connection state of the conduits 36 and 37, such as fluid such as blowby gas leaking outside from the conduits 36 and 37, is able to be reliably diagnosed.

Incidentally, the example embodiment described above may also be modified as described below. In the example embodiment described above, the time during which the connection state signal is "Hi" is integrated as the connection state signal fluctuation time Tn, and if the connection state signal fluctuation time Tn during one trip is equal to or longer than the predetermined time Tnp, it is determined that the connection state of the conduits 36 and 37 is abnormal. Alternatively, the time during which the connection state signal is "Low" may be integrated as a connection state signal fluctuation time Tm, and if the connection state signal fluctuation time Tm during one trip is shorter than a predetermined time Tmp, it may be determined that the connection state of the conduits 36 and 37 is abnormal. In this example, effects that are the same as the effects (1) and (3) to (5) obtained by the example embodiment described above are able to be obtained, and the effect described below is able to be obtained in place of the effect (2) described above.

(6) When the connection state signal fluctuates between "Low" and "Hi", the time during which that connection state signal is "Low" is integrated as the connection state signal fluctuation time Tm. If this connection state signal fluctuation time Tm during one trip is shorter than the predetermined time Tmp, it is determined that the connection state of the conduits 36 and 37 is abnormal. As a result, it is possible to inhibit a misdiagnosis that the connection state of the conduits 36 and 37 is abnormal from being made due to some random cause such as the reliability of the connection state signal temporarily decreasing as a result of noise. Therefore, a highly reliable abnormality diagnosis is able to be made.

In the example embodiment described above, the sum n1+n2 of the number of times n1 that the connection state signal has changed from "Low" to "Hi" and the number of times n2 that the connection state signal has changed from "Hi" to "Low" is counted as the connection state signal fluctuation count C. Alternatively, however, only the number of times n1 that the connection state signal has changed from "Low" to "Hi" may be counted as the connection state signal fluctuation count C, or only the number of times n2 that the connection state signal has changed from "Hi" to "Low" may be counted as the connection state signal fluctuation count C.

The value of the connected time Tc is cleared when the value of the connection state signal changes from "Low" to "Hi". However, instead of clearing the value of the connection time Tc when the connection state signal changes to "Hi", the time during which the connection state signal is "Low" when it has become "Low" again may be integrated with the last connected time Tc.

Steps S200, S210, and S230 may be omitted. That is, if the connection state signal fluctuation time Tn is shorter than the predetermined time Tnp (i.e., NO in step S150) and the connection state signal fluctuation count C is less than the predetermined count Cp (i.e., NO in step S160), then this cycle of the routine may end without determining that the connection state is either normal or abnormal.

In the example embodiment described above, an abnormality in the connection state of the conduits 36 and 37 is determined based on the connection state signal fluctuation count C counted during one trip as the predetermined period. Alternatively, however, a fixed period may be set in advance and an abnormality in the connection state of the conduits 36 and 37 may be determined based on the connection state signal fluctuation count C counted during this fixed period. Also, similarly, in the example embodiment described above, an abnormality in the connection state is also determined based on the connection state signal fluctuation time Tn integrated during one trip as the predetermined period. Alternatively, however, an abnormality in the connection state may be determined based on the connection state signal fluctuation time Tn integrated during a fixed period that has been set beforehand. However, in this example, it is necessary to change the routine shown in FIG. 4 from that described in the example embodiment described above. For example, step S120 may be changed to a step of determining whether a normal or abnormal determination of the connection state has been made during the fixed period, and step S180 may be changed to a step of determining whether a possible abnormality determination had been made during the last fixed period. Also, the connection state signal fluctuation count C and the connection state signal fluctuation time Tn need to be cleared each time the fixed period elapses.

In the example embodiment described above, it is determined that there is an abnormality in the connection state if one of the two conditions, i.e., that the connection state signal fluctuation time Tn shown in FIG. 2 be equal to or longer than the predetermined time Tnp (i.e., YES in step S150) and that the connection state signal fluctuation count C be equal to or greater than the predetermined count Cp (i.e., YES in step S160), is satisfied. However, it may also be determined that there is an abnormality in the connection state if both of these two conditions are satisfied.

Also, these two conditions are included in the abnormality determining condition. Alternately, however, step S150 may be omitted and only the condition that the connection state signal fluctuation count C be equal to or greater than the predetermined count Cp (i.e., YES in step S160) may be used as the abnormality determining condition. According to this example, effects similar to effects (1) and (3) to (5) obtained in the example embodiment described above are able to be obtained.

Furthermore, step S160 may be omitted and only the condition that the connection state signal fluctuation time Tn be equal to or longer than the predetermined time Tnp (i.e., YES in step S150) may used as the abnormality determining condition. According to this example, effects similar to effects (2) to (5) obtained in the example embodiment described above are able to be obtained.

In the example embodiment described above, a diagnosis that there is an abnormality in the connection state is confirmed, and thus a definite abnormality determination is made, when a possible abnormality determination of the connection state is made during the current trip (step S170 in FIG. 4B) and a possible abnormality determination had been made during the last trip (i.e., YES in step S180). Alternatively, a definite abnormality determination may be made when it has been determined that there is an abnormality in the connection state during the current trip, irrespective of the last determination results. That is, steps S170 and S180 in FIG. 4 may be omitted. According to this example, effects similar to effects (1), (2), (4), and (5) obtained in the example embodiment described above are able to be obtained.

Also, a diagnosis that there is an abnormality in the connection state is confirmed, and thus a determination that a definite abnormality has occurred is made, when a possible abnormality determination has continued to be made for three or more consecutive trips. However, in this example, if it is determined that a definite abnormality has occurred based on the fact that a possible abnormality determination has been made for three consecutive trips, for example, it is necessary to change step S180 in FIG. 4 according to the number of trips. More specifically, step S180 may be changed to a step of determining whether a possible abnormality determination has continued to be made for the last two consecutive trips, for example.

An abnormality determination is made for the connection state of the first conduit 36 and the second conduit 37, but instead of or in addition to this determination, for example, an abnormality determination may also be made in a similar manner to that in the example embodiment for the connection state of the first conduit 36 and the oil tank 30 shown in FIG. 1.

In the example embodiment described above, the abnormality diagnosis is made with respect to the connection state of the first conduit 36 and the second conduit 37 that form the blowby gas introduction conduit that introduces blowby gas from the oil tank 30 to the intake passage 25. However, this abnormality diagnosis is not limited to the blowby gas introduction conduit, but may also be used for another conduit such as the intake passage or the exhaust passage. According to this example, effects similar to effects (1) to (4) obtained in the example embodiment described above are able to be obtained.

Also, the connection state abnormality determination may be made with respect to a member in which a passage, such as a passage formed inside a housing, for example, that enables fluid to flow through that passage, instead of with respect to a conduit. According to this example as well, effects similar to effects (1) to (4) obtained in the example embodiment described above are able to be obtained.

In the example embodiment and the examples thereof described above, the electrical conduction state of the pair of conduits for which the determination is to be made is monitored, and a determination as to whether there is an abnormality related to that connection state is made. Alternatively, the pressure, temperature, or composition (i.e., the concentration of the inclusion, for example) or the like of the fluid flowing through the conduits may be monitored, and a determination regarding an abnormality in the connection state of the pair of conduits may be made based on the results. With this example, the abnormality may be diagnosed regardless of whether the pair of members for which the abnormality determination is to be made are conductive members or resinous members. According to this example as well, effects similar to the effects (1) to (3) and (5) obtained in the example embodiment described above are able to be obtained.

In the example embodiment and the examples described above, a connection state abnormality is diagnosed for members, such as the conduits given as an example, inside which a fluid passage is formed, as a pair of members for which the determination is to be made. However, the connection state abnormality may also be diagnosed for a structure other than such conduits. For example, a vibration sensor may be provided on each of a pair of members, and it may be determined whether the detection values detected by these vibration sensors have at least a predetermined correlation. If these detection values have at least a predetermined correlation, it is determined that the pair of members are in a normal connected state, but if the detection values do not have a predetermined correlation or greater, it is determined that the connection state is a state other than the normal connected state.

What is claimed is:

1. A vehicular abnormality diagnosing apparatus that diagnoses an abnormality regarding a connection state of a pair of members that are mounted in a vehicle and connected together, comprising:
    a detecting portion that outputs a first detection signal when the pair of members are in a normal connected state, and outputs a second detection signal when the pair of members are in a state other than the normal connected state, as an output signal;
    a counting portion that counts at least one of the number of times that the output signal changes from the first detection signal to the second detection signal and the number of times that the output signal changes from the second detection signal to the first detection signal, as an output signal fluctuation count; and
    a determining portion that determines that there is an abnormality in the connection state of the pair of members when an abnormality determining condition is satisfied, wherein the abnormality determining condition includes a condition that the output signal fluctuation count during a predetermined period be equal to or greater than a predetermined count.

2. The vehicular abnormality diagnosing apparatus according to claim 1, wherein the determining portion sets, as the predetermined period, an operating period from when the vehicle starts to be operated until the vehicle stops being operated, and includes a storing portion that stores, as possible abnormality information even after the operating period ends, an indication that it has been determined that there is the abnormality in the connection state of the pair of members during the operating period, when it has been determined that there is an abnormality in the connection state of the pair of members during the operating period, and an abnormality confirming portion that executes an abnormality confirmation process of confirming a diagnosis that the connection state of the pair of members is abnormal and storing the diagnosis, when the possible abnormality information corresponding to a plurality of consecutive operating periods is all stored in the storing portion.

3. The vehicular abnormality diagnosing apparatus according to claim 2, wherein the determining portion further includes an initializing portion that initializes the possible abnormality information stored in the storing portion, when the operating period has ended without the indication that it has been determined that there is the abnormality in the connection state of the pair of members.

4. The vehicular abnormality diagnosing apparatus according to claim 2, wherein the abnormality confirming portion executes the abnormality confirming process when the possible abnormality information corresponding to two consecutive operating periods is all stored in the storing portion.

5. The vehicular abnormality diagnosing apparatus according to claim 1, wherein the pair of members are formed of conductive members and are electrically conducted when in the normal connected state; and the detecting portion is a portion that outputs the first detection signal when the pair of members are in a conducted state, and outputs the second detection signal when the pair of members are in a nonconducted state.

6. The vehicular abnormality diagnosing apparatus according to claim 1, wherein a fluid passage that enables fluid to flow is formed inside the pair of members.

7. The vehicular abnormality diagnosing apparatus according to claim 1, wherein the pair of members form a blowby gas introduction conduit that introduces blowby gas from an oil tank to an intake passage.

8. A vehicular abnormality diagnosing apparatus that diagnoses an abnormality regarding a connection state of a pair of members that are mounted in a vehicle and connected together, comprising:
    a detecting portion that outputs a first detection signal when the pair of members are in a normal connected state, and outputs a second detection signal when the pair of members are in a state other than the normal connected state, as an output signal;
    an integrating portion that integrates the time during which the second detection signal is output, as the output signal fluctuation time, when the output signal fluctuates between the first detection signal and the second detection signal; and
    a determining portion that determines that there is an abnormality in the connection state of the pair of members when an abnormality determining condition is satisfied, wherein the abnormality determining condition includes a condition that the output signal fluctuation time during a predetermined period be equal to or longer than a predetermined time.

9. The vehicular abnormality diagnosing apparatus according to claim 8, wherein the determining portion sets, as the predetermined period, an operating period from when the vehicle starts to be operated until the vehicle stops being operated, and includes a storing portion that stores, as possible abnormality information even after the operating period ends, an indication that it has been determined that there is the abnormality in the connection state of the pair of members during the operating period, when it has been determined that there is an abnormality in the connection state of the pair of members during the operating period, and an abnormality confirming portion that executes an abnormality confirmation process of confirming a diagnosis that the connection state of the pair of members is abnormal and storing the diagnosis, when the possible abnormality information corresponding to a plurality of consecutive operating periods is all stored in the storing portion.

10. The vehicular abnormality diagnosing apparatus according to claim 9, wherein the determining portion further includes an initializing portion that initializes the possible abnormality information stored in the storing portion, when the operating period has ended without the indication that it has been determined that there is the abnormality in the connection state of the pair of members.

11. The vehicular abnormality diagnosing apparatus according to claim 9, wherein the abnormality confirming portion executes the abnormality confirming process when the possible abnormality information corresponding to two consecutive operating periods is all stored in the storing portion.

12. The vehicular abnormality diagnosing apparatus according to claim 8, wherein the pair of members are formed of conductive members and are electrically conducted when in the normal connected state; and the detecting portion is a portion that outputs the first detection signal when the pair of members are in a conducted state, and outputs the second detection signal when the pair of members are in a non-conducted state.

13. The vehicular abnormality diagnosing apparatus according to claim 8, wherein a fluid passage that enables fluid to flow is formed inside the pair of members.

14. The vehicular abnormality diagnosing apparatus according to claim 8, wherein the pair of members form a blowby gas introduction conduit that introduces blowby gas from an oil tank to an intake passage.

15. A vehicular abnormality diagnosing apparatus that diagnoses an abnormality regarding a connection state of a pair of members that are mounted in a vehicle and connected together, comprising:
   a detecting portion that outputs a first detection signal when the pair of members are in a normal connected state, and outputs a second detection signal when the pair of members are in a state other than the normal connected state, as an output signal;
   an integrating portion that integrates the time during which the first detection signal is output, as the output signal fluctuation time, when the output signal fluctuates between the first detection signal and the second detection signal; and
   a determining portion that determines that there is an abnormality in the connection state of the pair of members when an abnormality determining condition is satisfied, wherein the abnormality determining condition includes a condition that the output signal fluctuation time during a predetermined period be shorter than a predetermined time.

16. The vehicular abnormality diagnosing apparatus according to claim 15, wherein the determining portion sets, as the predetermined period, an operating period from when the vehicle starts to be operated until the vehicle stops being operated, and includes a storing portion that stores, as possible abnormality information even after the operating period ends, an indication that it has been determined that there is the abnormality in the connection state of the pair of members during the operating period, when it has been determined that there is an abnormality in the connection state of the pair of members during the operating period, and an abnormality confirming portion that executes an abnormality confirmation process of confirming a diagnosis that the connection state of the pair of members is abnormal and storing the diagnosis, when the possible abnormality information corresponding to a plurality of consecutive operating periods is all stored in the storing portion.

17. The vehicular abnormality diagnosing apparatus according to claim 16, wherein the determining portion further includes an initializing portion that initializes the possible abnormality information stored in the storing portion, when the operating period has ended without the indication that it has been determined that there is the abnormality in the connection state of the pair of members.

18. The vehicular abnormality diagnosing apparatus according to claim 16, wherein the abnormality confirming portion executes the abnormality confirming process when the possible abnormality information corresponding to two consecutive operating periods is all stored in the storing portion.

19. The vehicular abnormality diagnosing apparatus according to claim 15, wherein the pair of members are formed of conductive members and are electrically conducted when in the normal connected state; and the detecting portion is a portion that outputs the first detection signal when the pair of members are in a conducted state, and outputs the second detection signal when the pair of members are in a non-conducted state.

20. The vehicular abnormality diagnosing apparatus according to claim 15, wherein a fluid passage that enables fluid to flow is formed inside the pair of members.

* * * * *